(12) United States Patent
Hurlburt

(10) Patent No.: US 7,201,247 B2
(45) Date of Patent: Apr. 10, 2007

(54) ALL WHEEL DRIVE UTILITY VEHICLE WITH BOGEY BEAM SUSPENSION

(75) Inventor: Joseph C. Hurlburt, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/431,877

(22) Filed: May 10, 2006

(65) Prior Publication Data

US 2006/0201722 A1 Sep. 14, 2006

Related U.S. Application Data

(62) Division of application No. 10/766,144, filed on Jan. 27, 2004, now Pat. No. 7,108,086.

(51) Int. Cl.
*B60K 17/34* (2006.01)

(52) U.S. Cl. ............... 180/233; 180/252; 180/253; 180/311; 180/312; 280/781; 280/786; 280/788; 280/798

(58) Field of Classification Search ............... 180/209, 180/233, 252, 253, 266, 311, 312; 280/781, 280/786, 788, 798, 124.1, 124.156
See application file for complete search history.

(56) References Cited

U.S. PATENT DOCUMENTS 3,743,314 A * 7/1973 Archer .................. 280/786
5,107,951 A * 4/1992 Kawamura ............ 180/248

* cited by examiner

*Primary Examiner*—Eric Culbreth
(74) *Attorney, Agent, or Firm*—Stephen A. Kucchianeri; John William Stader; Michael C. Harms

(57) ABSTRACT

A utility vehicle that has a bogey beam suspension for the front steered wheels is also provided with all wheel drive by mounting a drive shaft within the bogey beam so that power can be furnished to the front axle. For a six wheel vehicle the middle axle is mounted on the rear of the bogey beam and driven from the rear drive axle by a universal drive assembly. In the four wheel version in which a resilient member is attached between the vehicle and the rear of the bogey beam, the rear drive axle is interconnected with the rear of the front wheel drive shaft by a universal drive assembly.

10 Claims, 4 Drawing Sheets

ALL WHEEL DRIVE UTILITY VEHICLE WITH BOGEY BEAM SUSPENSION

CROSS-REFERENCE TO RELATED PATENT APPLICATIONS

This divisional application claims priority under 35 U.S.C. § 120 from U.S patent application Ser. No. 10/766,144 filed on Jan. 27, 2004 now U.S. Pat. No. 7,108,086.

BACKGROUND OF THE INVENTION

This invention deals generally with off road vehicles and more specifically with an all wheel drive vehicle that has proportional distribution of load among its wheels.

Off road utility vehicles are becoming quite common for recreational and some occupational purposes. During some seasons of the year they are heavily advertised on television, and those commercials almost always show them taking sharp turns and cresting hills at high speeds. That is all very well for the camera, but it is not easily accomplished in the real world without careful design of the vehicle. If the suspension system of such an off road vehicle is not designed to accommodate to rough terrain, it is easy to end up with one or more wheels off the ground or with very light loading on some wheels. In such circumstances the steering control of the vehicle can be dramatically affected. In fact, even on level ground, the steering on some vehicles can be negatively affected by merely placing a heavy load in the cargo carrying area.

This problem has been essentially solved by a suspension structure disclosed in U.S. Pat. Nos. 6,629,699; 6,536,545; 6,557,661; and 6,601,665 by Hurlburt, who is also the inventor of the invention described herein. The suspension system includes a "bogey beam" which is a beam parallel to the axis of the vehicle. For a four wheeled vehicle the front axle is mounted on the forward end of the bogey beam and a suspension strut connects the rear end of the bogey beam to the frame. On a six wheel vehicle, instead of the suspension strut the middle axle is attached at the rear end of the bogey beam.

For both the four and six wheel versions, the primary place the bogey beam is attached to the vehicle frame is at a pivot assembly between the front and rear attachment points of the axles or the suspension strut. The action of the bogey beam is best described in regard to the six wheel version. The simplest pivot assembly is a rod with an axis transverse to the common longitudinal axis of the vehicle and the bogey beam, so the bogey beam therefore pivots on the pivot assembly only in the vertical plane. Thus, as the front wheels and axle move upward, the middle wheels and axle moves downward. This action causes the load transferred from the pivot assembly to the bogey beam to be shared between the front and middle axles in proportion to the spacing of each axle from the pivot assembly. Since a typical sharing of the load is to have nearly equal loads on the front and middle axles, the typical location of the pivot assembly is approximately midway between the front and middle axles.

With the bogey beam attached to the frame at only the pivot assembly, the load on the entire front end of the vehicle is shared proportionally by the front and middle axles. Furthermore, with the use of conventional lateral pivoting of the axles around the vehicle axis, the axles themselves distribute the load equally between their two wheels, and the load at the front end is therefore distributed among all four wheels. This arrangement virtually assures that no distribution of the load on the vehicle can lift or lighten the load on the front steering wheels to the detriment of control.

The system described above has been utilized and proven very effective, but it has only been used with front steering wheels that are not driven. No vehicles with bogey beams have had driven front wheels.

It would be very desirable to be able to use the bogey beam suspension system on an all wheel drive vehicle.

SUMMARY OF THE INVENTION

The present invention uses shaft drives to feed power to not only the front steering axle of four and six wheel vehicles, but also to the middle wheels of a six wheel vehicle. The geometry of the bogey beam is particularly advantageous for transmitting power from the middle axle to the front axle of a vehicle. Since the front axle is attached to the front of the bogey beam and the middle axle is attached to the rear of the bogey beam, a drive shaft can be attached to and oriented parallel to the bogey beam. With such a drive shaft connected to the differentials of both the middle axle and the front steering axle, it can conveniently transfer power from the middle axle to the front axle.

The preferred embodiment of the invention uses a sophisticated way to mount the front axle drive shaft parallel to the bogey beam. In the preferred embodiment, the bogey beam is constructed as a hollow tube, and the drive shaft is mounted within the tube. The ends of the tube are attached to the differentials of the front and middle axles so that the transfer of power is then accomplished by the drive shaft that is inside the bogey beam. The driven steered wheels on the front axle are powered from the drive shaft within the bogey beam by any of the conventional means used in the many four wheel drive vehicles in current production.

Power can be furnished to the middle axle for both transmission to the front axle and for use on the middle wheels by any means that accommodates the movement of the middle axle with the rear end of the bogey beam. One such arrangement to power the middle axle when it is mounted on the bogey beam is disclosed in U.S. Pat. No. 6,536,545 by Hurlburt. That patent shows the middle axle driven from the rear axle by chain drives.

However, in the preferred embodiment of the invention, a universal drive assembly is used to power the middle axle from the rear axle that is itself conventionally interconnected with the vehicle engine through the transmission. The universal drive assembly comprises a telescoping shaft with universal joints on both ends. With one end of the shaft attached to the rear axle drive with one universal joint and the other telescoping end of the shaft attached to the middle axle with the other universal joint, the universal drive assembly can accommodate all of the relatively limited motion of the middle axle on the end of the bogey beam.

The bogey beam suspension and power transfer system of the preferred embodiment are also practical for use with a four wheel drive vehicle with a bogey beam suspension. For such a vehicle, as disclosed in U.S. Pat. No. 6,557,661 by Hurlburt, with only rear wheel drive, the rear end of the bogey beam is attached to the vehicle frame by a suspension strut. With such a structure, the universal drive assembly can be attached from the rear axle directly to the front axle drive shaft at the rear end of the bogey beam. The front axle can thereby be powered in the same manner as for the six wheel vehicle, and the universal drive assembly accommodates the motion of the rear end of the bogey beam in the same way as it does in the six wheel vehicle.

Another aspect of an all wheel drive vehicle that is accommodated by the invention should be appreciated. While driving straight, all wheel drive is very helpful; however, during sharp turns front steered tires must travel further than the unsteered axles, and poor turning. turf damage, and excessive tire wear is the result. To counteract this problem an automatic steering axle drive disengagement can be used on die front steered axle. In such conventional systems, when the turn surpasses a preset limit, the drive power to the front steered axle is disengaged.

The present invention thereby adds a new dimension to utility vehicles. It provides an all wheel drive vehicle, either four wheel or six wheel, with far superior load weight distribution, ground traction, and steering than anything presently available.

DETAILED DESCRIPTION OF THE INVENTION

Figure 1:
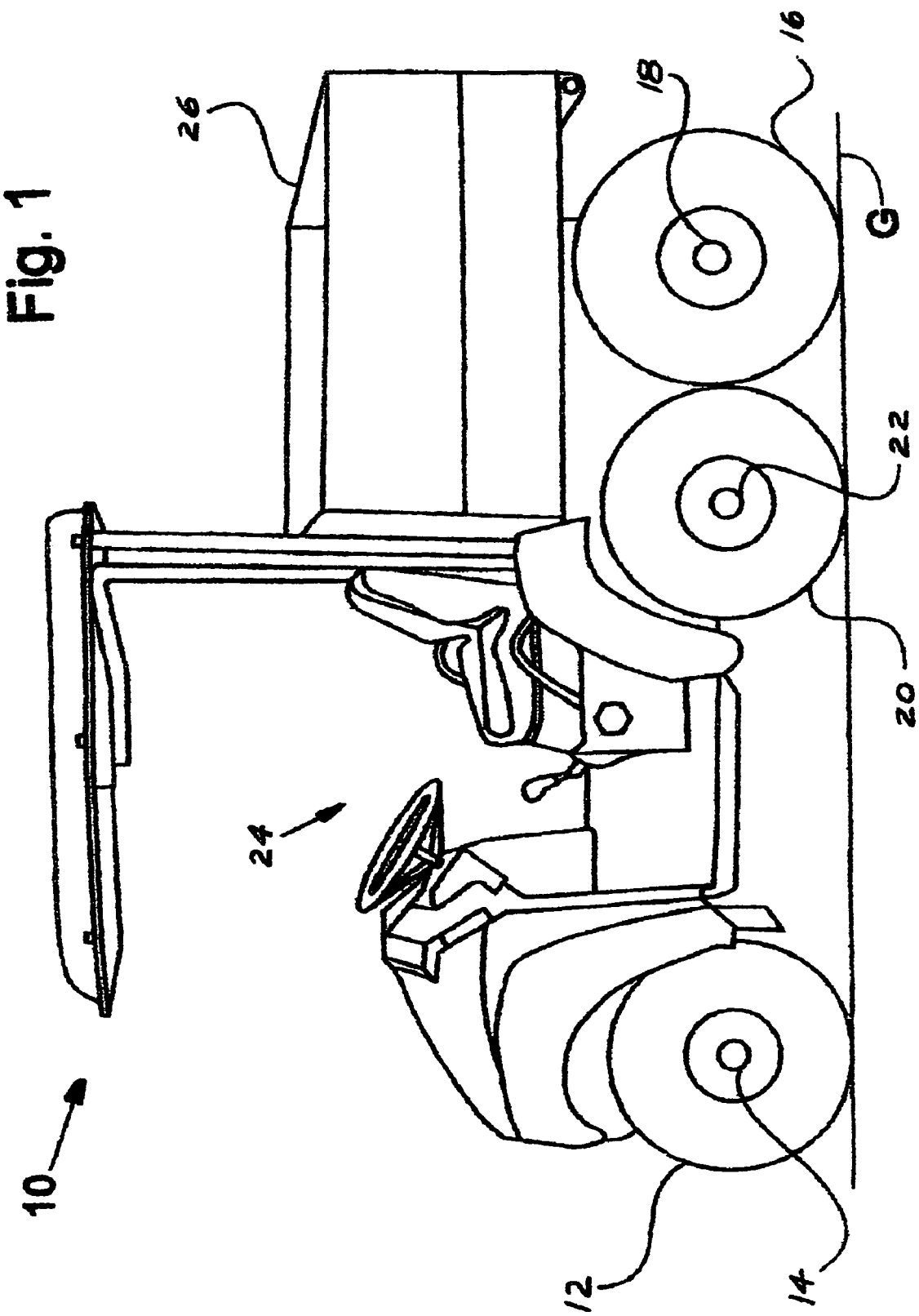
FIG. 1 is a perspective side view of a typical six wheel utility vehicle upon which the preferred embodiment of the invention is installed.

FIG. 1 is a perspective side view of a typical six wheel utility vehicle upon which the preferred embodiment of the invention is installed. Vehicle 10 has all its wheels powered and it is supported above the ground G by front steered and driven wheels 12 mounted on front steering axle 14, by rear driven wheels 16 mounted on rear drive axle 18, and by middle driven wheels 20 mounted on middle axle 22. Vehicle 10 includes an operator compartment 24, with seats and the typical conventional controls, and a load bed 26 behind operator compartment 24. Except for the fact that vehicle 10 has all its wheels powered and includes a bogey beam suspension, which is discussed below, it is quite conventional.

Figure 2:
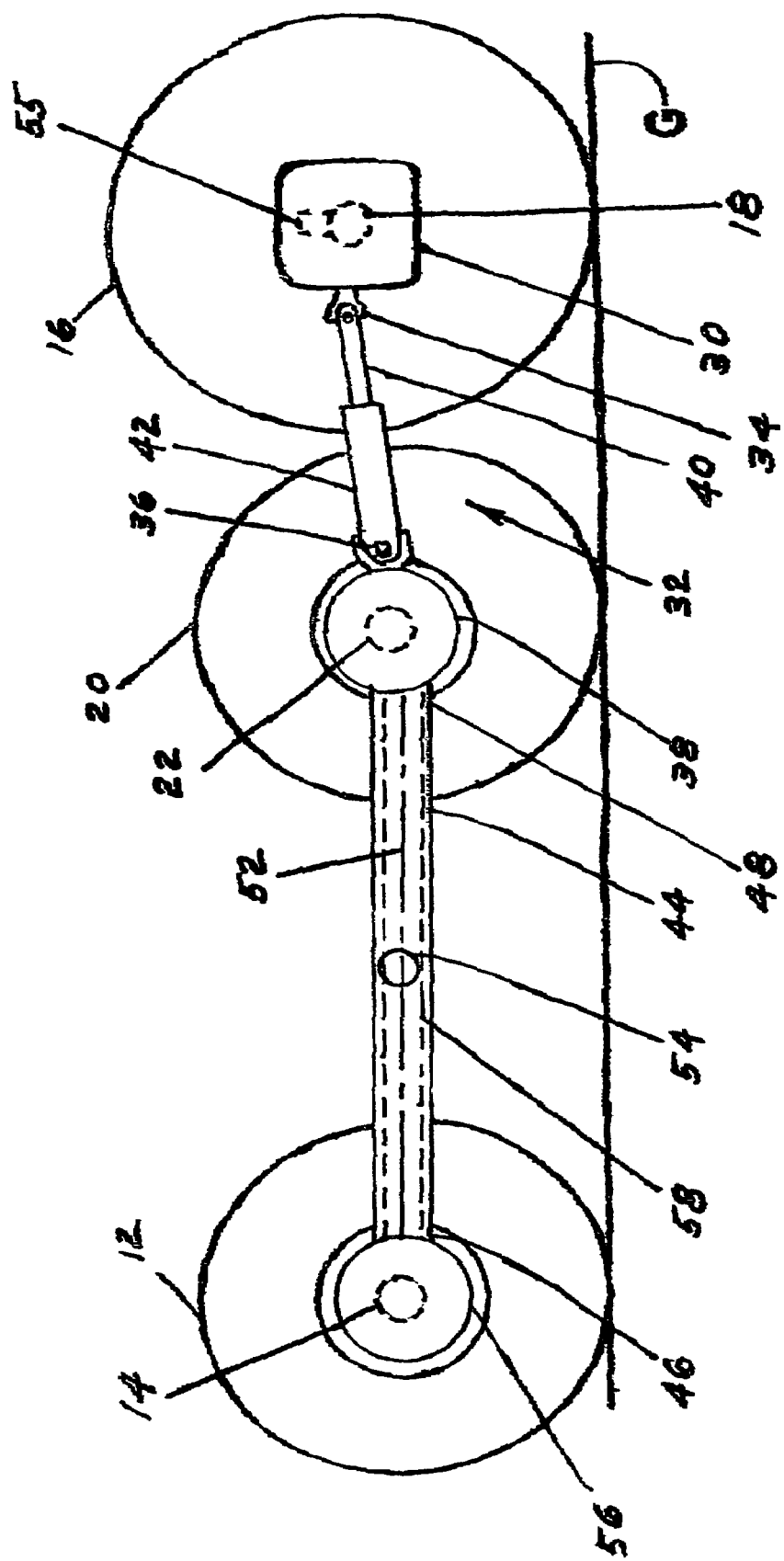
FIG. 2 is a schematic view of only the wheels and drive mechanism of the preferred embodiment of the invention viewing the center and one side of the vehicle from just beyond the center of the vehicle.
Figure 3:
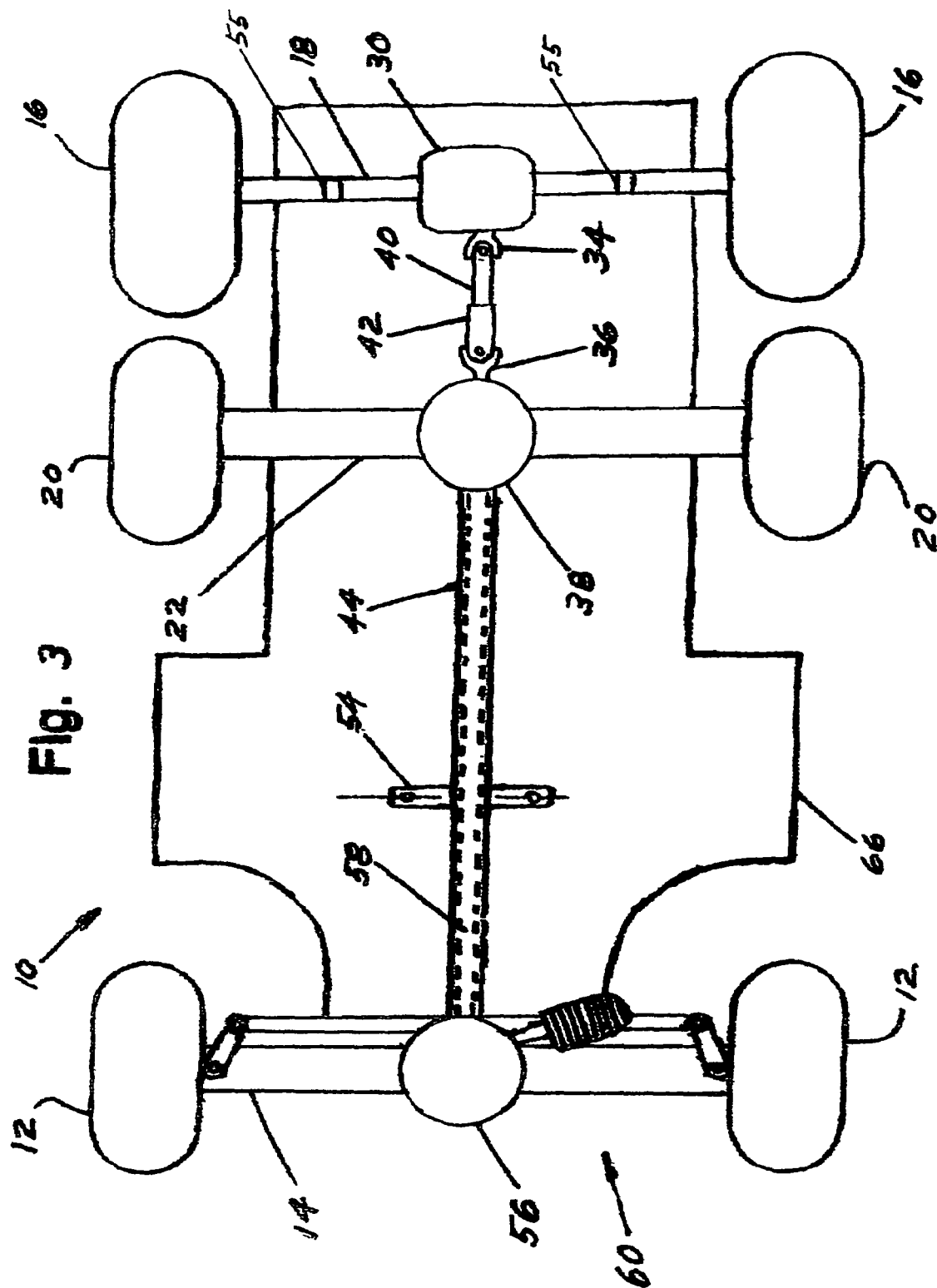
FIG. 3 is a bottom plan view of the frame and drive apparatus of a six wheel utility vehicle provided with the preferred embodiment of the invention.

FIG. 2 is a schematic view of only the wheels and drive mechanism of the preferred embodiment of the invention viewing the center and one side of the vehicle from just beyond the center of the vehicle, and FIG. 3 is a bottom plan view of the frame and drive apparatus of a six wheel utility vehicle provided with the preferred embodiment of the invention. The following description essentially applies to both FIG. 2 and FIG. 3.

As previously noted, all the wheels of the vehicle are powered. Power is first supplied to rear wheels 16 by an engine (not shown) through transmission 30. Transmission 30 also provides power to middle wheels 20 through universal drive assembly 32. Universal drive assembly 32 accommodates to variations in the relative positions of rear wheels 16 and middle wheels 20. This accommodation is accomplished because universal joints 34 and 36 are attached to transmission 30 and middle wheel differential 38. respectively, so that the changing vertical relationship between rear wheels 16 and middle wheels 20 can be accommodated. The universal drive assembly also includes an assembly while telescoping shafts 40 and 42 attached to universal joints 34 and 36, respectively, thus, any adjustment in spacing between middle wheels 20 and rear wheels 16 causes telescoping shafts 40 and 42 to move together or separate, and power can still be transferred from rear axle 18 to middle axle 22.

It should be appreciated that, although the description above refers to a vehicle with both middle wheels 20 and front wheels 12 driven from rear wheels 16 by means of universal drive assembly 32, universal drive assembly 32 can also be used when only middle wheels 20 are driven. In that situation, all that is required is that drive shaft 58 be omitted from the structure shown in FIGS. 2 and 3.

The accommodation to changes in the spatial relationship of rear wheels 16 and middle wheels 20 is required because middle wheels 20 rise and fall from the action of bogey beam 44. The action of bogey beam 44 is fully described in U.S. Pat. No. 6,601,665 by the present inventor, the disclosure of which is incorporated herein and made of part of this disclosure. Nevertheless, the action of bogey beam 44 will also be described herein because the present invention adds valuable features to the bogey beam previously disclosed.

Bogey beam 44 is a suspension structure in which bogey beam 44 is a pivoting longitudinally oriented beam parallel to the axis Of the vehicle. Bogey beam 44 supports front wheel axle 14 at bogey beam forward end 46 and middle wheel axle 22 at bogey beam rear end 48. Bogey beam 44 permits predictable sharing of the frame load by front wheels 12 and middle wheels 20 while keeping all four of the front and middle wheels in contact with the ground. Part of the suspension structure is that both front wheel axle 14 and middle wheel axle 22 are constructed to pivot about axis 52 of bogey beam 44. This is a conventional structure for vehicle suspensions. The result is sharing of the axle load between the two wheels on opposite ends of the axle. Essentially it means that when one wheel rolls over, for instance, a dip in the ground, that wheel and that end of the axle pivot down into the dip rather than being supported in the air by the other wheel, which might occur if the axle were absolutely rigid. Thus, the axles of the vehicle of the preferred embodiment are conventionally constructed to share the load on each axle between the wheels on opposite ends of the axle by pivoting around the longitudinal axis of the vehicle.

While the pivoting of the axle permits sharing the axle load between the wheels, bogey beam 44 is the device that permits sharing the load between the axles of a vehicle in a predetermined manner. It should be apparent that without the use of the bogey beam and with the axles rigidly attached to the frame, a dip in the vehicle path would cause the rear and front wheels to support the middle wheels completely off the ground as they pass over the dip. The same phenomenon actually would occur when the front wheels or the rear wheels pass over the dip. Furthermore, since the front wheels provide the steering for the vehicle, when they are in the air there is no steering control for the vehicle.

Bogey beam 44 prevents this problem. Front axle 14 is attached to front end 46 of bogey beam 44 and middle axle 22 is attached to rear end 48 of bogey beam 44, and bogey beam 44 is attached to the vehicle frame only at pivot point 54. Thus, the load at the front of the frame is transferred to middle axle 22 and to front axle 14 only through pivot point 54 and bogey beam 44, and the division of the frame front load between front axle 14 and middle axle 22 will be determined by their distances from pivot point 54. When, as shown in FIG. 2, these distances are equal, the two axles share the load equally. However, this load sharing would be true, at least on level ground, even if bogey beam 44 were rigidly attached to the frame at the midpoint of the bogey beam.

The benefit of the pivoting bogey beam goes back to the previous discussion in regard to a vehicle with axles rigidly attached to the frame, and the middle wheels being suspended over a dip in the vehicle path. For a vehicle with a bogey beam as shown in FIG. 2 and FIG. 3, the pivoting action of bogey beam 44 would cause the middle axle to follow the dip in the road and to continue to share the load. Of course, the same thing would be true of the front axle going over a dip, and most important, there would be no loss of steering control.

It is appropriate to also point out at this point that the load on the rear of the vehicle is conventionally applied to rear axle 18, usually by shock absorbers of conventional construction, at connection points 55, one on each half of rear axle 18. Thus the entire vehicle load is shared by pivot point 54 near the front of the vehicle and connection points 55 near the rear.

The discussion to this point has been only in regard to the prior art bogey beam, and it is important to note that the prior art discloses front wheels that only steer the utility vehicle, and no front wheels that are powered. The problem of transmitting motive power to the front wheels is aggravated by the fact that even getting drive power to the middle wheels is difficult. This is because the middle axle of a bogey beam suspension is constantly changing its spatial relationship with the rear axle from which power is derived. To date, power transfer to the middle axle has only been by the use of chain drives, and even they have been limited by the need to keep the chains in proper alignment.

The present invention solves this problem of powering the middle axle by the use of universal drive assembly 32, which has been previously described, and also furnishes an apparatus to transfer power from the middle axle to the front axle.

Middle axle 22 and middle wheel differential 38 are mounted at rear end 48 of bogey beam 44 in a pivotal relationship to bogey beam 44, and front axle 14 and front differential 56 are similarly mounted in a pivotal relationship to bogey beam 44 at its front end 46. It is therefore practical to interconnect middle differential 38 to front differential 56 with a simple drive shaft 58. As shown in FIG. 2 and FIG. 3, when bogey beam 44 is hollow, drive shaft 58 can be completely enclosed within it. However, a solid bogey beam can also be used and the drive shaft can be mounted outside of and parallel to the bogey beam.

FIG. 3 is a bottom plan view of the frame and drive apparatus of six wheel utility vehicle 10 provided with the preferred embodiment of the invention. The previous discussion applies to both FIG. 2 and to FIG. 3 except for the addition of several components seen only in FIG. 3.

FIG. 3 shows steering assembly 60 attached to front wheels 12. Such a steering assembly is of conventional construction for steered and driven front wheels as is well known in the automotive art. FIG. 3 also shows a typical outline for frame 66 of such a vehicle.

Figure 4:
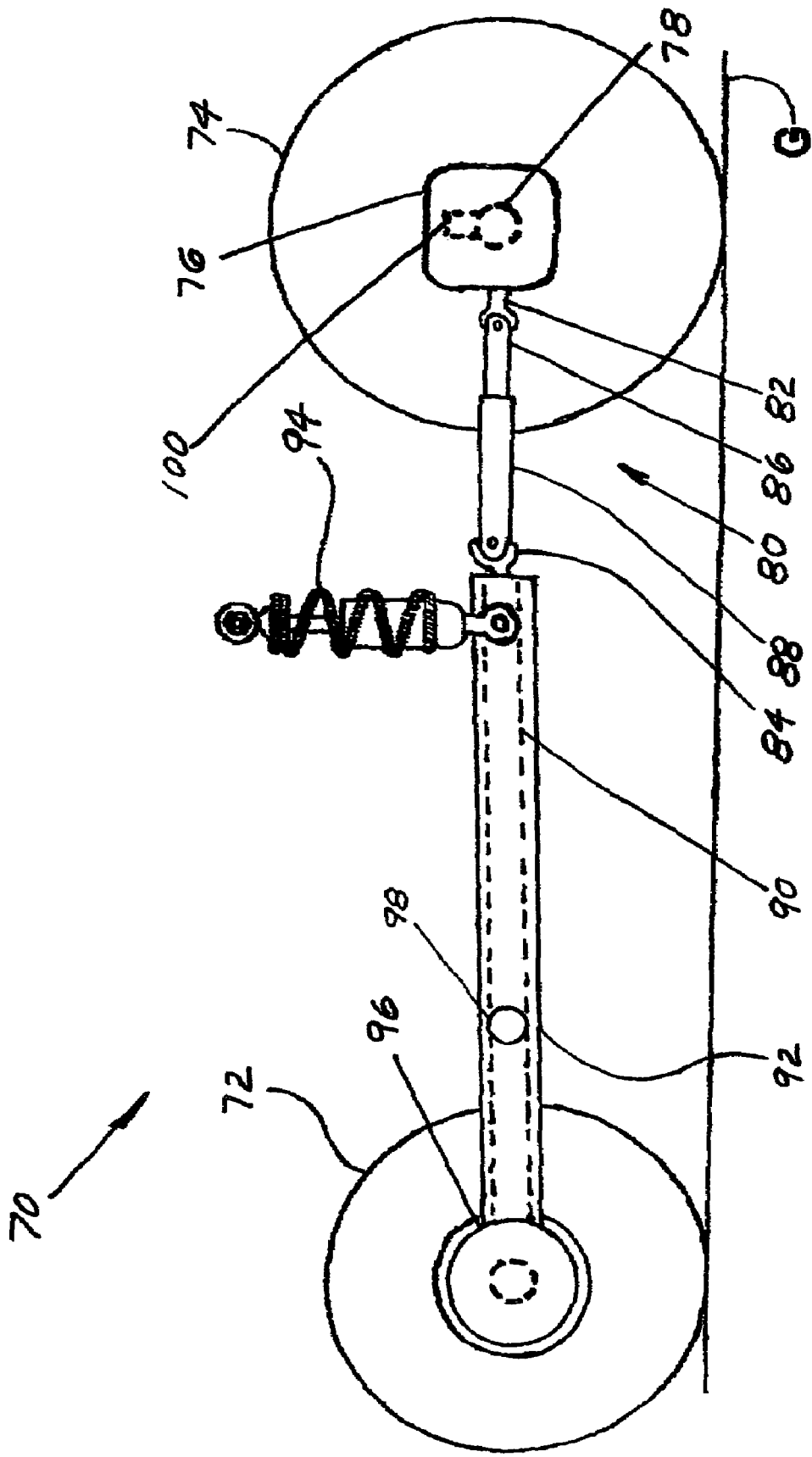
FIG. 4 is a schematic view of the drive mechanism of an alternate embodiment of the invention installed on a typical four wheel utility vehicle viewing the vehicle in the same manner as shown in FIG. 2.

FIG. 4 is a schematic view of the drive mechanism 70 of an alternate embodiment of the invention installed on a typical four wheel utility vehicle viewing the vehicle in the same manner as shown in FIG. 2.

FIG. 4 is quite similar to FIG. 2 except that drive mechanism 70 does not include a middle set of wheels. From wheels 72 are not only steered by conventional means, but they are also driven, and they receive their power from universal drive assembly 80. Rear wheels 74 are powered through transmission 76 which powers rear axle 78 in a conventional manner. Transmission 76 also drives universal drive assembly 80.

Universal drive assembly 80 is constructed in the same manner as universal drive assembly 32 of FIG. 2 and FIG. 3 in that is has universal joints 82 and 84 on its ends to accommodate to angular variations. Universal drive assembly 80 also includes telescoping sections 86 and 88 to account for varying spacing between the two universal joints. Universal joint 82 is attached to and driven by transmission 76 just as is done in the six wheel vehicle of FIG. 2, but in FIG. 4 universal joint 84 is attached to and directly powers drive shaft 90 which is enclosed within bogey beam 92.

The essential difference between FIG. 2 and FIG. 4 is that in drive mechanism 70 of FIG. 4, without the middle wheels, the vertical movement of front wheels 72 is counteracted by a resilient member such as suspension strut 94 instead of the middle wheels. The upper end of suspension strut 94 is connected to the frame or chassis (not shown) of the vehicle, and suspension strut 94 is conventionally constructed with a gas cylinder and a concentric spring. Suspension strut 94 serves as a suspension device holding front axle 96 in a predetermined position because suspension strut 94 is attached to the rear end of bogey beam 92. As discussed in regard to FIG. 2, bogey beam 92 pivots on pivot point 98, so that when front wheels 72 and front axle 96 are raised or lowered by variations in the ground surface, the vertical motion of front axle 96 is counteracted by suspension strut 94, which, by force exerted on the rear of bogey beam 92, also moves front axle 96 back into its predetermined position.

Any load placed in the load bed of the vehicle will be transferred to rear axle 78 through its connection points 100 with the vehicle frame (not shown) and to bogey beam 92 by means of pivot point 98 and suspension strut 94. The weight carried by front axle 96 is the difference between the loads at pivot point 98 and suspension strut 94. Therefore, the steering characteristics of front axle 96 will not be overwhelmed by any load placed in the vehicle because the load on rear axle 78 is always shared to some extent by front axle 96, and sufficient load is always maintained on front axle 96.

The front wheel drive system of the invention thereby attains all the benefits of the use of a bogey beam on a utility vehicle, but adds to the bogey beam construction the benefits of all wheel drive.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. In a utility vehicle having a frame supported by a front steering axle with a pair of front steered wheels mounted upon the front steering axle, a rear drive axle with a pair of driven rear wheels mounted upon the rear drive axle, and a longitudinally oriented bogey beam with the front steering axle attached at the front end of the bogey beam and a resilient member attached at the rear end of the bogey beam and to the vehicle, and the bogey beam attached to the vehicle at and pivoting about a pivot point between the front steering axle and the resilient member, the improvement comprising:

a drive shaft interconnected with the front steered wheels and interconnected with the rear drive axle.

2. The vehicle of claim 1 wherein the bogey beam is hollow, and the drive shaft is enclosed within the hollow bogey beam.

3. The vehicle of claim 1 wherein the resilient member is a suspension strut.

4. The vehicle of claim 1 further including a drive assembly interconnecting the rear drive axle to the drive shaft to transfer power to the Front steering axle.

5. The vehicle of claim 1 further including a transmission which powers the rear axle and a universal drive assembly interconnecting the transmission to the drive, shaft to transfer power to the front steering axle, wherein the universal drive assembly comprises a universal joint connected to each of the drive shaft and the transmission and an assembly with telescoping shafts interconnecting the two universal joints.

6. A utility vehicle comprising:
 a frame;
 a front steering axle with a pair of front steered and driven wheels mounted upon the front steering axle;
 a rear drive axle with a pair of driven war wheels mounted upon the rear drive axle;
 a longitudinally oriented bogey beam with the front steering axle attached at the front end of the bogey beam and a resilient member attached to the vehicle and to the bogey beam at the rear end of bogey beam, and the bogey beam attached to the vehicle at and pivoting about a pivot point between the front steering axle and the resilient member; and
 a drive shaft interconnected with the front steered wheels and interconnected with the rear drive axle and driving the front steered wheels.

7. The vehicle of claim 6 wherein the bogey beam is hollow, and the drive shaft is enclosed within the hollow bogey beam.

8. The vehicle of claim 6 wherein the resilient member is a suspension strut.

9. The vehicle of claim 6 further including a drive assembly interconnecting the rear drive axle to the drive shaft to transfer power to the front steering axle.

10. The vehicle of claim 6 further including a transmission which powers the rear axle and a universal drive assembly interconnecting the transmission to the drive shaft to transfer power to the front steering axle, wherein the universal drive assembly comprises a universal joint connected to each of the drive shaft and the transmission and an assembly with telescoping shafts interconnecting the two universal joints.

* * * * *